(12) United States Patent
Sågfors et al.

(10) Patent No.: US 8,812,006 B2
(45) Date of Patent: Aug. 19, 2014

(54) METHODS AND ARRANGEMENTS IN A WIRELESS COMMUNICATION SYSTEM

(75) Inventors: Mats Fredrik Sågfors, Kyrkslätt (FI); Robert Baldemair, Solna (SE); Magnus Lindström, Spånga (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 505 days.

(21) Appl. No.: 12/833,540

(22) Filed: Jul. 9, 2010

(65) Prior Publication Data

US 2011/0105165 A1    May 5, 2011

Related U.S. Application Data

(60) Provisional application No. 61/257,201, filed on Nov. 2, 2009.

(51) Int. Cl.
    *H04W 40/00*     (2009.01)
    *H04W 72/04*     (2009.01)

(52) U.S. Cl.
    CPC ............................ *H04W 72/04* (2013.01)
    USPC ........... 455/446; 455/447; 455/448; 455/449; 455/450; 455/451

(58) Field of Classification Search
    USPC .................................................. 455/446–455
    See application file for complete search history.

(56) References Cited

U.S. PATENT DOCUMENTS

| | | |
|---|---|---|
| 2009/0080428 A1 | 3/2009 | Witkowski |
| 2010/0120442 A1 | 5/2010 | Zhuang |
| 2010/0227569 A1* | 9/2010 | Bala et al. ............ 455/73 |
| 2010/0265847 A1 | 10/2010 | Lee et al. |
| 2010/0281985 A1 | 11/2010 | Kumagai et al. |
| 2011/0034175 A1 | 2/2011 | Fong et al. |
| 2011/0039593 A1* | 2/2011 | Lee et al. ............ 455/515 |
| 2011/0134759 A1 | 6/2011 | Kim et al. |

(Continued)

FOREIGN PATENT DOCUMENTS

| | | |
|---|---|---|
| CN | 101404526 A | 4/2009 |
| CN | 101541036 A | 9/2009 |

(Continued)

OTHER PUBLICATIONS

3rd Generation Partnership Project. "Carrier Aggregation in LTE-Advanced." TSG-RAN WG1 #53bis, R1-082468, Warsaw, Poland, Jun. 30-Jul. 4, 2008.
3rd Generation Partnership Project. "System Information Acquisition in CA." 3GPP TSG RAN WG2 Meeting #66bis, R2-093720, Los Angeles, USA, Jun. 29-Jul. 3, 2009.

(Continued)

*Primary Examiner* — Fayyaz Alam
(74) *Attorney, Agent, or Firm* — Coats & Bennett, PLLC

(57) ABSTRACT

The present invention relates to methods and arrangements in a wireless communication system supporting carrier aggregation and comprising a radio base station configured to broadcast system information in at least two cells. The method for the user equipment comprises receiving configuration information for an aggregation of the at least two cells from the radio base station, identifying a first of the at least two cells based on a configuration rule stating that the first of the at least two cells has a status that is different from the status of the remaining cells, and reading the broadcasted system information only in the identified cell. The method may also comprise obeying one or more parameters obtained from the read system information.

22 Claims, 7 Drawing Sheets

(56) References Cited

U.S. PATENT DOCUMENTS

| | | | |
|---|---|---|---|
| 2011/0159903 A1* | 6/2011 | Yuk et al. | 455/507 |
| 2011/0194514 A1 | 8/2011 | Lee et al. | |
| 2011/0211522 A1* | 9/2011 | Chung et al. | 370/315 |
| 2011/0211541 A1* | 9/2011 | Yuk et al. | 370/329 |
| 2011/0243034 A1 | 10/2011 | Yamada et al. | |
| 2012/0044922 A1 | 2/2012 | Ishii | |
| 2012/0093103 A1* | 4/2012 | Lee et al. | 370/329 |
| 2012/0115468 A1* | 5/2012 | Lindoff et al. | 455/434 |
| 2012/0157103 A1* | 6/2012 | Frenger et al. | 455/437 |
| 2012/0214541 A1* | 8/2012 | Narasimha et al. | 455/525 |

FOREIGN PATENT DOCUMENTS

| | | |
|---|---|---|
| JP | 2008309776 A | 12/2008 |
| WO | 2010064521 A1 | 6/2010 |
| WO | 2010126105 A1 | 11/2010 |

OTHER PUBLICATIONS

3rd Generation Partnership Project. "RACH for Carrier Aggregation." 3GPP TSG-RAN2 Meeting #66bis, R2-093844, Los Angeles, USA, Jun. 29-Jul. 3, 2009.

3rd Generation Partnership Project. "System Information Acquisition at the Start of Carrier Aggregation." 3GPP TSG RAN WG2#67, R2-094186, Shenzhen, China, Aug. 24-28, 2009.

3rd Generation Partnership Project. "System Information for Carrier Aggregation." 3GPP TSG-RAN WG2 Meeting #67bis, R2-095633, Miyazaki, Japan, Oct. 12-16, 2009.

3rd Generation Partnership Project. "System Information Acquisition for Carrier Aggregation." 3GPP TSG RAN WG2 Meeting #67bis, R2-095831, Miyazaki, Japan, Oct. 12-16, 2009.

Alcatel-Lucent, "Carrier Aggregation" 3GPP TSG-RAN WG2 Meeting #67bis, Miyazaki, Japan, Oct. 24, 2009, pp. 1-5, R2-095888.

* cited by examiner

US 8,812,006 B2

METHODS AND ARRANGEMENTS IN A WIRELESS COMMUNICATION SYSTEM

RELATED APPLICATION

This application claims priority under 35 U.S.C. §119(e) to Provisional Patent Application Ser. No. 61/257,201, filed Nov. 2, 2009, the entire contents of which are incorporated herein by reference.

TECHNICAL FIELD

The present invention generally relates to methods and arrangements in a wireless communication system supporting carrier aggregation. In particular it relates to methods and arrangements for transmitting and applying system information broadcast in multiple aggregated cells.

BACKGROUND

The Universal Mobile Telecommunication System (UMTS) is one of the 3G mobile communication technologies designed to succeed GSM. 3GPP Long Term Evolution (LTE) is a project within the $3^{rd}$ Generation Partnership Project (3GPP) to improve the UMTS standard to cope with future requirements in terms of improved services such as higher data rates, improved efficiency, and lowered costs. The Universal Terrestrial Radio Access Network (UTRAN) is the radio access network of a UMTS system and evolved UTRAN (E-UTRAN) is the radio access network of an LTE system. As illustrated in FIG. 1, a radio access network typically comprises user equipment (UE) 150 wirelessly connected to radio base stations (RBS) 110a-c, commonly referred to as NodeB (NB) in UTRAN and eNodeB (eNB) in E-UTRAN.

E-UTRA according to Release 8 (Rel-8) of the 3GPP specifications supports bandwidths up to 20 MHz. However, one of the requirements of future releases of this standard is expected to be the support of bandwidths larger than 20 MHz. A further important requirement on such releases is to assure backward compatibility with Rel-8. This should also include spectrum compatibility. That would imply that a future-release carrier, wider than 20 MHz, should appear as a number of Rel-8 carriers to a Rel-8 UE. Each such carrier is sometimes referred to as a Component Carrier (CC). In particular, for early deployments of future releases, it can be expected that there will be a smaller number of future-release UEs compared to many legacy Rel-8 UEs. Therefore, it is necessary to assure an efficient use of a wide carrier also for legacy UEs, i.e., that it is possible to implement carriers where legacy UEs can be scheduled in all parts of the wideband future-release carrier.

The straightforward way to obtain this would be by means of carrier aggregation. Carrier aggregation implies that a future-release UE can receive and send on multiple CCs, where the CCs have, or at least have the possibility of having, the same structure as a Rel-8 carrier. Carrier aggregation is illustrated in FIG. 2a, where five CCs 210, each of 20 MHz bandwidth, have been aggregated together to form an aggregated bandwidth 220 of 100 MHz. Carrier aggregation is planned for Release 10 (Rel-10) of the 3GPP LTE specifications.

Carriers can be aggregated contiguously, as illustrated in FIG. 2a, or they may be aggregated from discontinuous portions in the frequency domain (sometimes also called spectrum aggregation). FIG. 2b illustrates schematically an example with non-contiguous carriers.

With the carrier aggregation concept, it may be possible to support, among other things:

Higher bit-rates;
Farming of non-contiguous spectrum—i.e., to provide high bit-rates and better capacity also in cases when an operator lacks contiguous spectrum;
Fast and efficient load balancing between carriers.

The LTE carrier or spectrum aggregation has some similarities with concepts such as Dual- or Multi-Carrier (DC or MC) HSPA, where one or multiple carriers in UTRAN are combined.

It should be noted that carrier aggregation can be viewed as a UE-centric concept, in that one UE may be configured to use, e.g., the two left-most CCs (230) in FIG. 2b, another UE may be configured to use only a single CC such as the right-most CC (250) in FIG. 2b, and a third UE may be configured to use all of the CC (230, 240, 250) depicted in FIG. 2b. Thus, a UE may be configured with component carriers (CCs), on a carrier of a specific frequency within the same frequency band or within different frequency bands. Multiple uplink (UL) and downlink (DL) CCs are configured independently of each other, meaning that they are not necessarily configured as UL/DL pairs as in Rel-8/9 of the 3GPP LTE specifications. Asymmetric configurations are possible, where the number of configured UL CCs differ from the number of configured DL CCs.

Initially, the UE will be configured with one UL/DL CC pair on which it makes the initial random access. These CCs are called Primary Component Carriers (PCC). In addition to the UL/DL PCC pair, the eNB may configure the UE with additional CCs, so called Secondary Component Carriers (SCC) as needed.

Conventionally, a carrier is a portion of the frequency spectrum that can be used for transmission in UL and/or DL. The notion of cell is normally used to denote the radio network object that can be uniquely identified by a UE. In UTRAN, e.g., a cell is identified thanks to a cell identification that is broadcasted over a geographical area from one UTRAN access point. Typically, a cell is associated with a single pair of UL and DL carriers in FDD, and a single carrier that provides both UL and DL resources, if the mode is TDD. There may be multiple cells associated with one Carrier, as long as the cells are physically separated from each other. This is the case, e.g., when neighbouring eNBs each implement cells on the same carrier.

As already mentioned above, future releases of e-UTRAN introduces the support of a larger bandwidth or frequency spectrum, and for compatibility reasons the extra bandwidth may be seen as additional carriers of, e.g., 20 MHz, so-called component carriers (CC) that are aggregated together. However, by applying the notion of cell being the radio network object associated with a certain CC—a cell that may be identified by the UE—a UE using carrier aggregation in connected mode may also be referred to as being connected to multiple aggregated cells: one primary cell (referred to as PCC above, and for which notations such as PCell, primary serving cell and serving cell are also used), and additional configured CCs that are part of another set of secondary cells (referred to as SCC above, and for which notations such as SCell, secondary serving cell, and secondary cell are also used).

In LTE, many different scenarios and carrier types are being discussed, including the aggregation of Rel-8 backwards compatible carriers. Also, non-backwards compatible and extension carriers are being discussed. Such carriers may not be available for Rel-8 terminals. A particular and relevant example of a plausible carrier aggregation scenario includes the case when two or more Rel-8 downlink carriers/cells, are aggregated for a UE. It should be noted that carrier aggregation is typically and mainly relevant for a connected UE, which is a UE that is actively involved in transmission to and from the eNB, and thus has a connection with the eNB controlling the aggregated carriers/cells.

The aggregated carriers/cells may thus also be available for Rel-8 UEs, meaning that each of the carriers/cells may be independently available for single-cell operation. Such a single-cell operation includes idle mode camping when the UE is typically inactive, and connected mode operation in single-cell mode. Therefore, these Rel-8 compatible carriers/cells will have to provide System Information (SI) that is broadcasted in the cell, such that UEs may perform, e.g., idle mode camping and cell selection according to the rules set by the parameters broadcasted in SI. Other sets of particular relevance that also must be broadcast in each of the Rel-8 carriers/cells are parameters related but not limited to:

Random Access (RA), and RA channel (RACH) parameters, i.e., common parameters that define how a UE should access a cell;

UL parameters, i.e., common parameters e.g., related to UL bandwidth, frequency, PUCCH (Physical Uplink Control Channel), and PUSCH (Physical Uplink Shared Channel);

DL parameters, i.e., common parameters e.g., related to PFICH (Physical Control Format Indicator Channel), PDSCH (Physical Downlink Shared Channel), paging information, and DL frequency and bandwidth.

Cell-specific timers and constants.

SI also includes, e.g., sets of parameters related to cell and radio access technology (RAT) selection. "Common parameters" is used to denote parameters that many or all UEs in a cell are required to acquire according to specific rules in specifications. Such common parameters will typically be read and used by many UEs. Deviations from this general rule may be specified.

In Rel-8, the SI of relevance for a connected mode UE is distributed in the Master Information Block (MIB), and the first two System Information Blocks (SIB1 and SIB2). It may be specified that the UE should maintain updated information of this required SI, as specified in the 3GPP standard. When the SI changes the UEs are notified by different means, in order for them to re-acquire the required Si.

It is possible that also non-backwards compatible carriers/cells may be available for idle mode camping and single-cell operation. In this case these carriers/cells will also have to broadcast SI with sets of cell-specific parameters similar to the ones described above.

The DL of a cell will typically include broadcast of SI parameters that are relevant for this cell, including parameters of relevance both for the DL and an UL. Technically, it would be possible to, in addition to the aforementioned parameters, broadcast parameters associated with a second cell on the DL of a first cell. However, such a solution may not be preferable, since the parameters associated with the second cell should then often also be broadcast on the DL of the second cell. This duplication is not desirable, and 3GPP has therefore agreed to, in Rel-10, not broadcast information related to a second cell on a first cell.

In a typical use-case, illustrated by the signaling diagram of FIG. 3a, a UE 310 will first be connected to a single cell, also called the primary cell, following an RRC connection setup procedure 301 similar to those known from Rel-8. Only then may the eNB 320, based on different criteria, decide to configure the UE 310 for reception (DL) and transmission (UL) on multiple aggregated carriers/cells. This means that the eNB 320 may send a configuration message, typically an RRCConnectionReconfiguration message 302, including information about the additional UL and DL CCs that the UE is supposed to take into use. The UE replies to the configuration message, typically with an RRCConnection ReconfigurationComplete message 303.

Such a connected mode UE will now have knowledge of multiple UL and DL CCs, which may aggregate up to a very large bandwidth, and the UE is now ready to be scheduled on all of the CCs—sometimes on individual CC, and sometimes on all CC at the same time. There is now thus SI available on multiple DL Component Carriers or cells that the UE has been configured with. However, as described above, this required SI is of relevance also for UEs operating in single-cell mode, such as for Rel-8 UEs that lack the capability for carrier aggregation. It may happen that some of the SI that is of relevance for such single-cell operation is not valid, not useful, and possibly even harmful as it may result in unwanted restrictions to the flexibility of carrier aggregation operation, as will be further described below. The problem is thus that SI of relevance for single-cell operation is broadcasted in all cells in order to, e.g., provide backwards compatibility, but when a cell should be used for carrier aggregation this single-cell SI is not optimal.

Assume now the example above, where a UE has first been connected to one cell—the primary cell—that includes both a configuration of a DL and an UL, and that the UE is configured to aggregate one additional DL carrier of a secondary cell. Assume further that SI of relevance to the DL carriers is broadcasted in both aggregated cells. However, as noted above, the SI broadcasted on each of the cells will provide SI of relevance also for single-carrier operation. Thus, the SI broadcasted in the secondary cell will include information about a corresponding UL configuration, including e.g., UL bandwidth and frequency, RACH, PUCCH and PUSCH parameters. Thus, if the UE operating with multiple aggregated carriers is required to read and follow the SI broadcasted on both the primary and the secondary cell, it will result in a situation where the UE by necessity also configures all the corresponding parameters for single-cell operation.

In the following example, an RBS is in control of three UL and DL carriers in three cells, here denoted UL1/DL1/cell1, UL2/DL2/cell2, and UL3/DL3/cell3. When operated in single-cell mode, the carriers are coupled such that UL1 is operated together with DL1, UL2 with DL2, and UL3 with DL3, respectively. Thus, any SI of relevance for ULx/DLx is broadcast on cellx, as illustrated in FIG. 2c. Note that the example does not rule out that ULx is on the same frequency as DLx, which is the case for a TDD mode.

It is assumed that a UE is connected to the cell2 defined by DL2, i.e., the UE 310 follows known Rel-8 procedures, reads required SI on DL2, and uses UL2 for UL transmissions (state 304 in signaling diagram of FIG. 3b). Furthermore, the eNB 320 now wants to configure the UE 310 with two additional DL carriers, since the eNB concludes that the UE needs a larger DL bandwidth. The eNB sends a configuration message in 305 including information that the UE may additionally use DL1 in cell1 and DL3 in cell3, in addition to the already existing DL2. However, if the UE now reads the required SI broadcasted in cell1 and cell3 as well, following existing art, the UE will take also the corresponding UL configurations into use, i.e., UL1 and UL3. This was clearly not desirable, as the eNB only found reasons to aggregate DL carriers in this case, and not to configure the UE with additional UL bandwidth that greatly exceeds the needs of the UE.

Thus, existing art provides inflexibility, in that SI of relevance for single-cell operation may be too restrictive for carrier aggregation operation.

Another example concerns, e.g., the Random Access (RA) configuration. Assume now that the UE has been configured with two aggregated cells in both UL and DL, say UL1/DL1 in cell and, UL2/DL2 in cell2. The SI parameters concerning carrier frequency and bandwidth broadcasted on both the cells are in this case of relevance. However, both cells' SI includes RA parameters, offering the UE a possibility to perform RA on both of the UL carriers. It may be that the eNB wants to constrain the UE to perform RA only on one particular of the available ULs. With present art, this is not possible, since the UE will read SI comprising RA parameters on both cells and thus perform RA on both ULs.

A further example concerns, e.g., PUCCH control. It has recently been agreed that it shall be possible to provide all PUCCH control information on one single UL carrier, regardless of how many UL and DL carriers that are configured for a UE. In the examples illustrated above, each cell will provide independent PUCCH parameters. However, the UE should only follow PUCCH parameters broadcasted on one of the cells.

Yet another example concerns timers and constants. Each of the aggregated cells may provide independent timer and constant values that might be different in value. However, the timers and constants may not be relevant per cell, but rather per UE. A UE may e.g., maintain only a single timer t1 that expires when the value T1 is reached, but SI on all the cells is offering different values for this T1, and it is unclear which one of the values that the UE should apply.

SUMMARY

It is therefore an object of several embodiments of the present invention to address the above mentioned problems, and to provide a flexible solution for applying system information broadcasted on multiple cells in a wireless communication system supporting carrier aggregation. This object and others may be achieved by one or more of the methods and devices according to the independent claims, and by several of the embodiments according to the dependent claims.

In accordance with a first aspect of embodiments of the present invention, a method for a user equipment in a wireless communication system supporting carrier aggregation is provided, where the system comprises a radio base station configured to broadcast system information in two or more cells. The method comprises receiving configuration information for an aggregation of the two cells from the radio base station. It also comprises identifying a first of the two cells based on a configuration rule stating that the first of the two cells has a status that is different from the status of the remaining cell, and reading the broadcasted system information only in the identified cell.

In accordance with a second aspect of embodiments of the present invention, a method for a radio base station in a wireless communication system supporting carrier aggregation is provided, where the radio base station is capable to transmit data to a user equipment in two or more aggregated cells. The method comprises broadcasting system information in the two cells, and transmitting configuration information for an aggregation of the two cells to the user equipment. The configuration information comprises a configuration rule stating that a first of the two cells has a status that is different from the status of the remaining cell, in order for the user equipment to read the broadcasted system information only in the cell with the different status.

In accordance with a third aspect of embodiments of the present invention, a user equipment configured to be used in a wireless communication system supporting carrier aggregation is provided, the system comprising a radio base station configured to broadcast system information in two or more cells. The user equipment comprises a receiving unit adapted to receive configuration information for an aggregation of the two cells from the radio base station. It also comprises an identifying unit adapted to identify a first of the two cells based on a configuration rule stating that the first of the two cells has a status that is different from the status of the remaining cell, and a reading unit adapted to read the broadcasted system information only in the identified cell.

In accordance with a fourth aspect of embodiments of the present invention, a radio base station configured to be used in a wireless communication system supporting carrier aggregation is provided. The radio base station is capable to transmit data to a user equipment in two or more aggregated cells, and comprises a broadcasting unit adapted to broadcast system information in the two cells. It also comprises a transmitting unit adapted to transmit configuration information for an aggregation of the two cells to the user equipment, the configuration information comprising a configuration rule stating that one of the two cells has a status that is different from the status of the remaining cell, in order for the user equipment to read the broadcasted system information only in the cell with the different status.

An advantage of some embodiments of the present invention is that they allow carrier aggregation in a flexible way, such that configuration information that is common to both single-cell operation and carrier aggregation operation is read and obeyed by all UEs, but where additional parameters and rules are provided for UEs operating in carrier aggregation mode.

Another advantage of some embodiments of the present invention is that they provide a lean way of signaling, such that the overhead in signaling can be minimized.

Other objects, advantages and novel features of the invention will become apparent from the following detailed description of the invention when considered in conjunction with the accompanying drawings.

DETAILED DESCRIPTION

Figure 1:
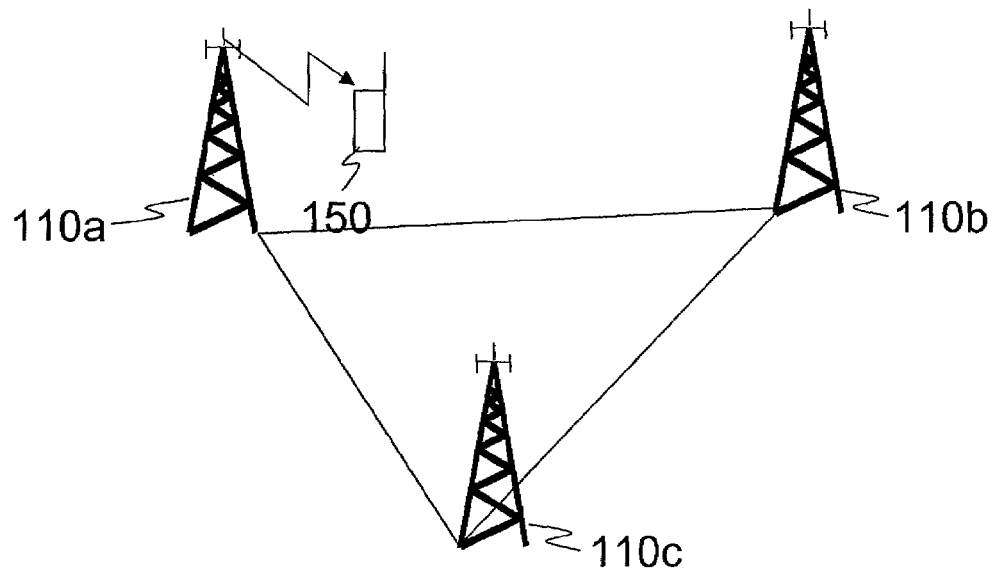
FIG. 1 illustrates schematically a conventional radio access network wherein the present invention may be implemented.
Figure 2A:
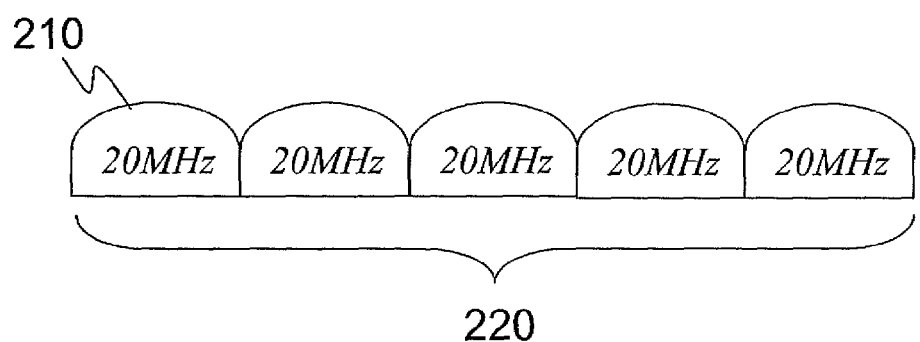
FIGS. 2a-b illustrate schematically carrier aggregation according to prior art.
Figure 2B:
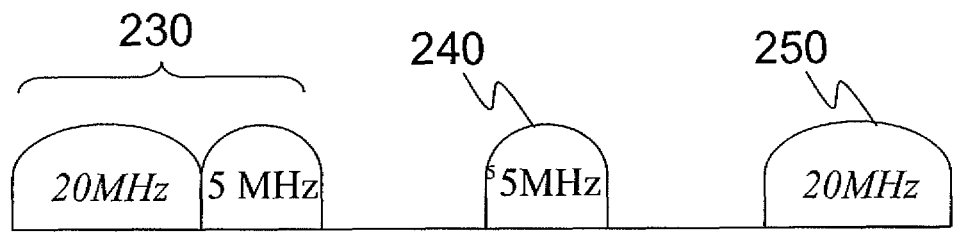
Figure 2C:
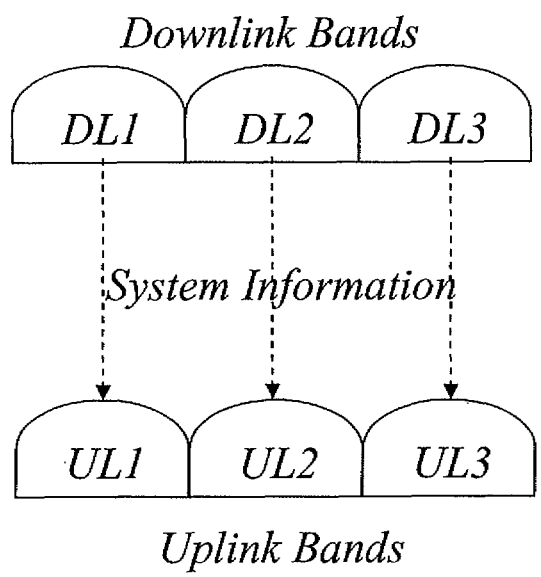
FIG. 2c illustrates schematically example uplink and downlink carriers and the corresponding system information flow according to prior art.
Figure 3A:
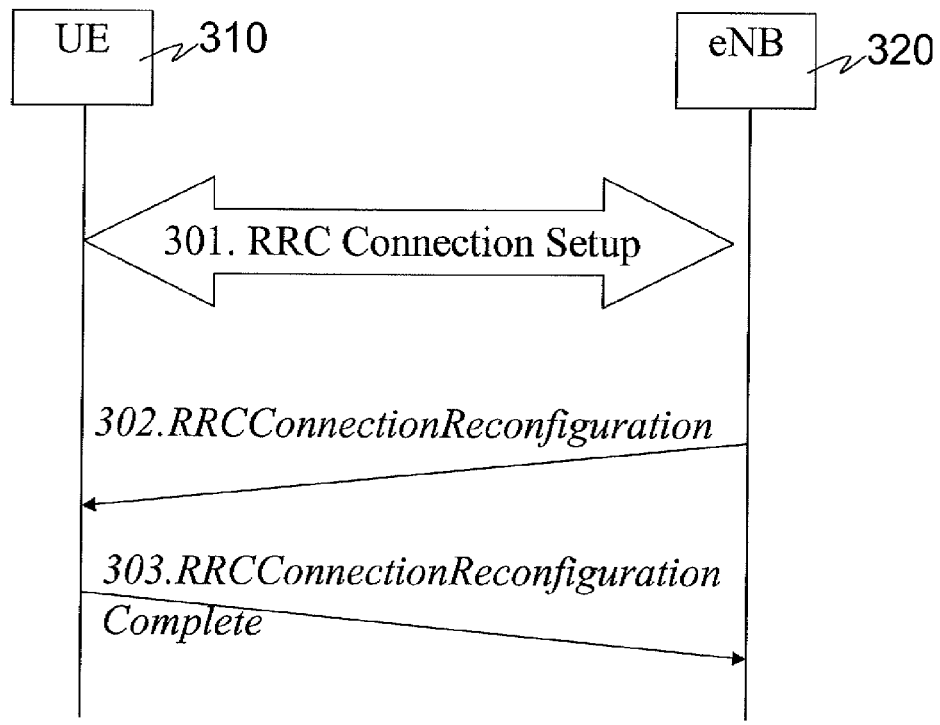
FIGS. 3a-b illustrate signaling diagrams for the RRC connection reconfiguration procedure according to prior art.
Figure 3B:
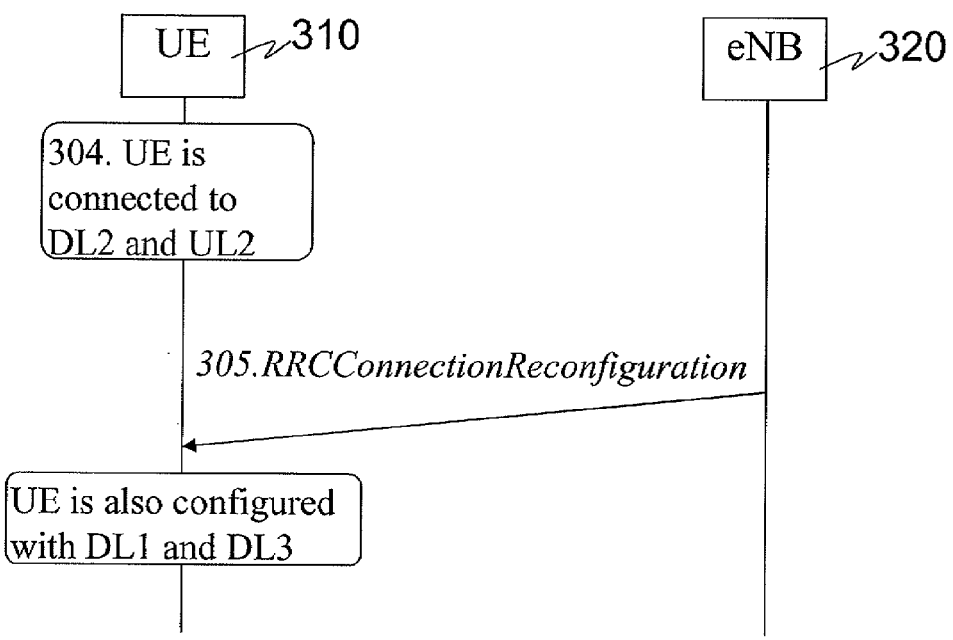

In the following, the invention will be described in more detail with reference to certain embodiments and to accompanying drawings. For purposes of explanation and not limitation, specific details are set forth, such as particular scenarios, and techniques, in order to provide a thorough understanding of the present invention. However, it will be apparent to one skilled in the art that the present invention may be practiced in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The embodiments of the present invention are described herein by way of reference to particular example scenarios. In particular embodiments of the invention are described in a non-limiting general context in relation to an E-UTRAN. It should though be noted that the invention and its embodiments may also be applied to other types of radio access networks configured to use carrier aggregation. It should be noted that the notation and terminology used in the description may change and does by no means restrict the applicability of embodiments of the present invention.

In embodiments of the present invention, the problem that system information (SI) broadcasted in the cells of a wireless communication system is not adapted for a UE that operates in a carrier aggregation mode, is addressed by a solution where a UE, when it is configured by the eNB to aggregate two cells, applies a configuration rule for identifying in which one of the cells that it should read the broadcasted SI. The configuration rule may be provided by the eNB in a dedicated configuration message, and this dedicated message may also include configuration parameters that are needed for the configuration of the cell in which the broadcasted SI was not read.

In one or more embodiments of the present invention the eNB is configured to broadcast SI comprising a set of configuration parameters, and to transmit information to the UE operating in carrier aggregation mode that makes it possible for the UE to apply SI broadcasted in only one of the aggregated cells.

In further embodiments of the present invention, the information transmitted to the UE operating in carrier aggregation mode:
is transmitted as dedicated information, and/or
includes parameters that replaces the SI parameters from some of the cells that were not read, and/or
controls the UE to follow SI from one of the multiple carriers.

Embodiments of the present invention thus include a solution where the UE will not follow any of the SI provided on a particular DL carrier, and where all the relevant information is provided with dedicated signaling.

Detailed embodiments of the present invention are illustrated using an example. Assume again the aforementioned example, where an eNB is in control of three UL and DL carriers in three cells, here denoted UL1/DL1/cell1, UL2/DL2/cell2, and UL3/DL3/cell3. The DL carriers provide SI of relevance for each DL & UL pair, such that ULx is configured in the SI provided on DLx in cellx. Now, a UE is establishing a connection to the cell defined by the SI on a first DL carrier (e.g., cell1 and DL1), i.e., after the establishment, the UE is prepared to send and receive (i.e., to be scheduled) on UL1 and DL1, respectively.

The eNB now configures the UE to also use the downlink DL2 in cell2, typically by sending an RRCConnectionReconfiguration message, including information about the additional DL2 that the UE is supposed to take into use. Cell1 is now the primary cell, and cell2 a secondary cell. According to one embodiment of the present invention, the eNB may now send a dedicated configuration message to the UE, where the message includes SI parameters of relevance for the DL2 carrier. This dedicated configuration message may e.g., be comprised in the RRC Connection Reconfiguration message. The UE is thus, after receiving the configuration message, prepared to receive data on both DL1 and DL2, even though it has only read SI on DL1.

According to another embodiment of the present invention, the eNB broadcasts SI on the multiple downlink carriers or cells (DL1-3/cells1-3 in the example), each of which provides the same set of parameters, for example—but not limited to—timers and constants. The eNB also provides information about which of the multiple sets of parameters that shall be used, i.e., in which of the cells that the UE shall read the SI. The information is included in a configuration rule, where one of the cells is given a different status from the other configured cells, such that the UE obeys the parameters obtained from the cell with the different status.

In one embodiment, the cell with the different status is the primary cell, so the UE will only read SI broadcasted in the primary cell, i.e., cell1 in the example above. In still another embodiment, the information provided by the eNB also comprises an indication of which of the cells that is the primary cell, as the configuration of which cell that is the primary cell may vary over time. What is initially the primary cell (cell1 in the example) may e.g., in a later stage of the connection turn out to be a secondary cell instead.

Figure 4:
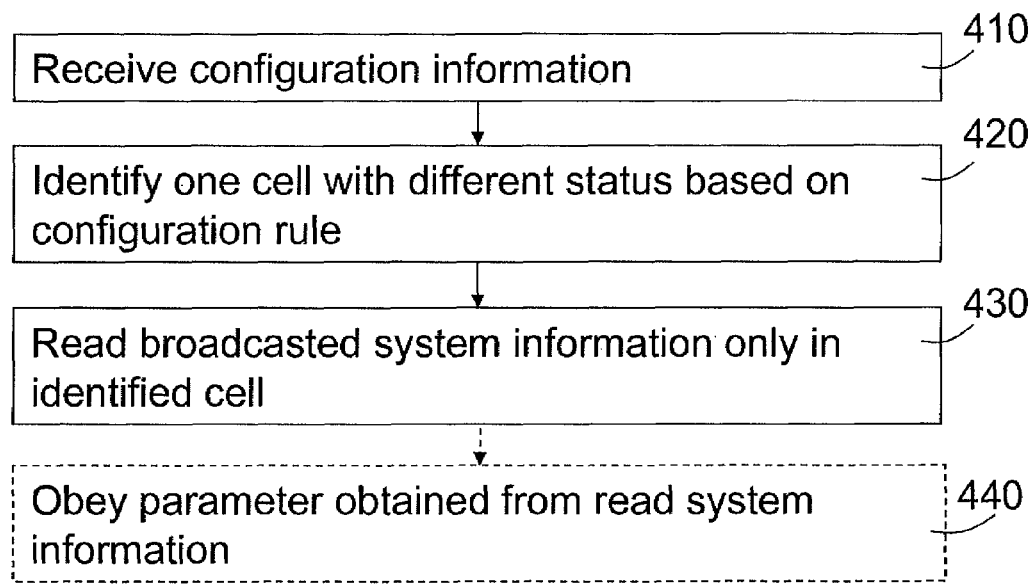
FIG. 4 is a flowchart of the method in the user equipment according to embodiments of the present invention.

FIG. 4 is a flowchart of the method for the UE of a wireless communication system supporting carrier aggregation, according to one embodiment of the present invention. The system comprises an RBS such as an eNB configured to broadcast system information in all cells that it serves. The eNB is also capable of aggregating the cells that it serves. The method illustrated in the flowchart comprises the following:

410: Receive configuration information for an aggregation of two or more cells from the eNB. In this embodiment only two cells are aggregated. The configuration information may in a first embodiment be received in a dedicated message, such as an RRCConnectionReconfiguration message, comprising information about the two cells that the UE may aggregate.

420: Identify a first of the two cells based on a configuration rule stating that the first of the two cells has a status that is different from the status of the remaining cell. The configuration rule may in a second embodiment be comprised in the received configuration information. However, it may also be a pre-defined configuration rule, which reduces the signaling overhead.

430: Read the broadcasted SI only in the identified cell.

In a third embodiment of the present invention, the cell with the different status is the primary cell, which means that it is the primary cell that is identified as the cell in which SI shall be read. Furthermore, in a fourth embodiment the received configuration information also comprises an indication of which one of the aggregated cells that is the primary cell (or more general which one of the aggregated cells that is the cell with the different status). This is needed as it is possible that the eNB makes a change of primary cell, meaning that another cell that was previously a secondary cell is configured to be the primary cell. This change will thus have to be signaled to the UE in order for the UE to identify the correct cell in which SI should be read based on the configuration rule. The configuration information may in a fifth embodiment also comprise configuration parameters that are to be used instead of the SI parameters that are broadcasted in the remaining cell, e.g., the secondary cell. As the SI broadcasted in the secondary cell is not read by the UE, the UE will instead use the configuration parameters signaled in the configuration information to make an appropriate configuration of the UL and DL in the aggregated cells. The first to fifth embodiments described above may be combined in any possible way.

The method also optionally comprises obeying (or applying), in 440, at least one parameter obtained from the read SI. In one embodiment, the UE thus reads and obeys at least one parameter that is broadcasted in the primary cell. This or these read and obeyed parameters are the parameters that are valid for a UE in carrier aggregation mode, and all other configuration parameters that are needed may e.g., be comprised in the dedicated configuration message.

Figure 5:
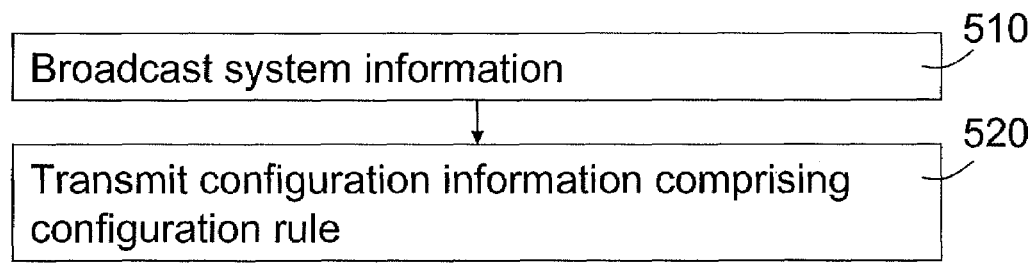
FIG. 5 is a flowchart of the method in the radio base station according to embodiments of the present invention.

FIG. 5 is a flowchart of the method for the RBS, in a wireless communication system supporting carrier aggregation, according to the second embodiment of the present invention described above with reference to FIG. 4. The RBS may e.g., be an eNB in an E-UTRAN. The eNB is capable to transmit data to a UE in two aggregated cells. The method illustrated in the flowchart comprises the following:

510: Broadcast SI in both cells. The SI broadcasted in a cell comprises configuration parameters relevant for that cell.

520: Transmit configuration information for an aggregation of the two cells to the user equipment, where the configuration information comprises a configuration rule stating that a first of the two cells has a status that is different from the status of the remaining cell. This is done in order for the user equipment to read the broadcasted system information only in the cell with the different status, as described above. The configuration information is in the first embodiment transmitted in a dedicated message. In one embodiment described above with reference to FIG. 4, the configuration rule is predefined and need not be comprised in the transmitted configuration information, which reduces the signaling.

In the third embodiment of the present invention, the cell with the different status is the primary cell. Furthermore, in the fourth embodiment the transmitted configuration information also comprises an indication of which one of the aggregated cells that is the primary cell (or which aggregated cell that is the cell with the different status). The configuration information may in the fifth embodiment also comprise configuration parameters that are to be used instead of the SI parameters that are broadcasted in the remaining cell, e.g., the secondary cell. The first to fifth embodiments described above may be combined in any possible way.

Figure 6A:
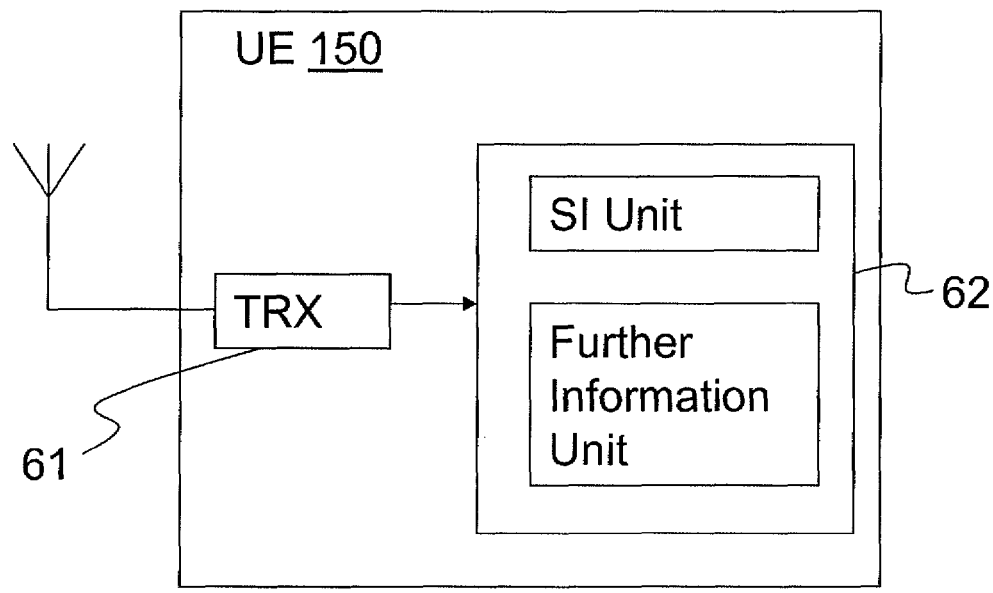
FIGS. 6a-b illustrate schematically a block diagram of a user equipment and a user equipment control unit respectively, according to embodiments of the present invention.

FIG. 6a is a simplified block diagram of the UE 150 according to embodiments of the present invention, and discloses an antenna connected to a transceiver unit 61, that forwards control information received in the DL to a control unit 62. The control unit 62 comprises a SI Unit that controls the operation of the UE in accordance with the SI received. It also comprises a Further Information Unit that controls the operation of a UE in carrier aggregation operation in accordance with the received further configuration information. The control unit 62, the Further Information Unit and the SI Unit may be implemented as hardware, software or a combination of the two.

Figure 6B:
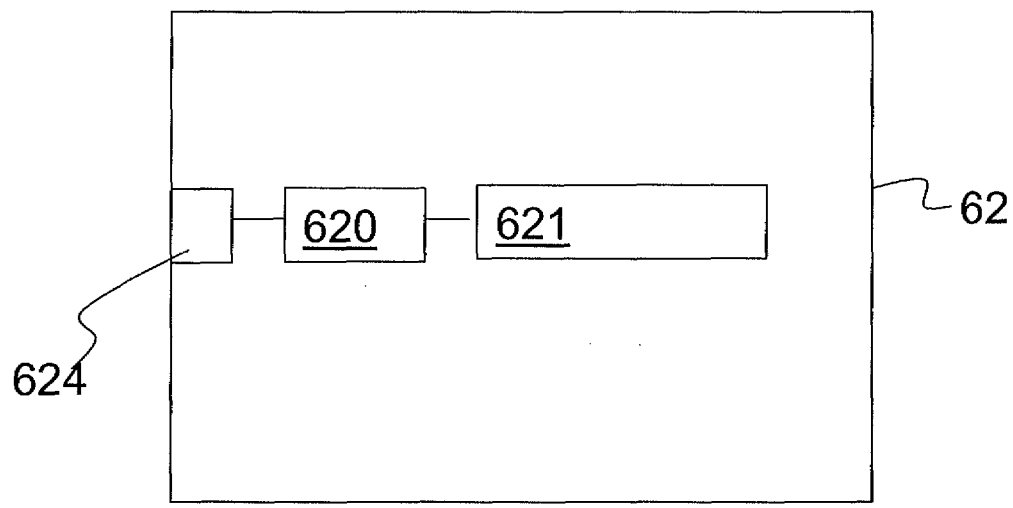

FIG. 6b is a block diagram illustrating the control unit 62 as implemented in a combination of hardware and software according to embodiments of the present invention. It comprises a processor unit 620, and interface 624 to the transceiver units. Furthermore the control unit 62 comprises at least one computer program product 621 in the form of a non-volatile memory, e.g., an EEPROM, a flash memory and a disk drive. The computer program product 621 comprises a computer program, which comprises code means which when run on the processor unit 620 causes the processor unit 620 to perform the steps of the procedures or methods described earlier in conjunction with FIG. 4.

Figure 7A:
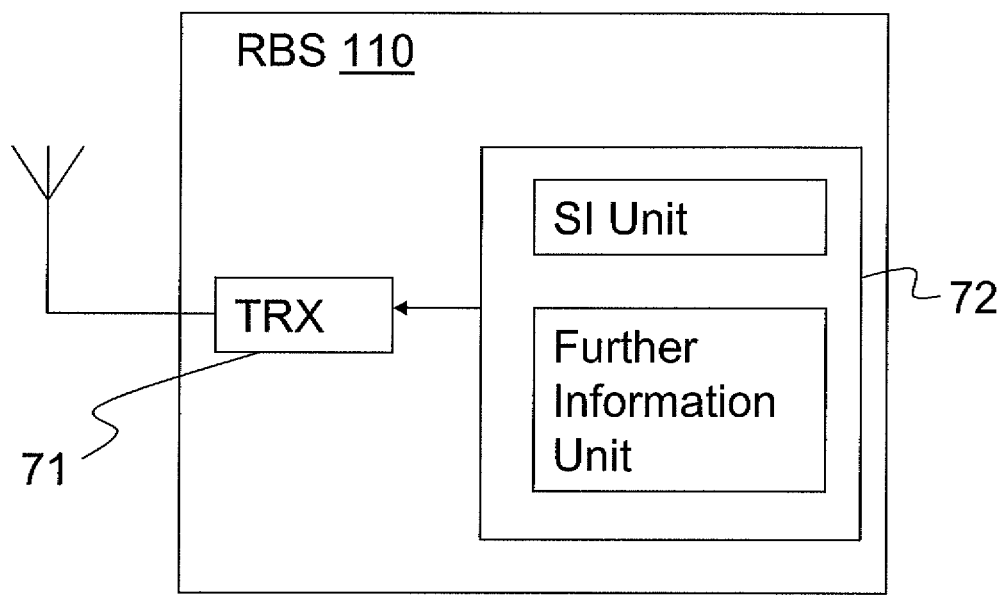
FIGS. 7a-b illustrate schematically a block diagram of an radio base station and an radio base station control unit respectively, according to embodiments of the present invention.

FIG. 7a is a simplified block diagram of the RBS 110 according to embodiments of the present invention, and discloses a transceiver unit 71, connected to an antenna, and controlled by a control unit 72, that among other controls what control information that is transmitted from the transceiver 71. The control unit 72 comprises a SI Unit that controls the SI broadcasted. It also comprises a Further Information Unit that controls information sent to a UE in carrier aggregation operation. The control unit 72, the Further Information Unit and the SI Unit may be implemented as hardware, software or a combination of the two.

Figure 7B:
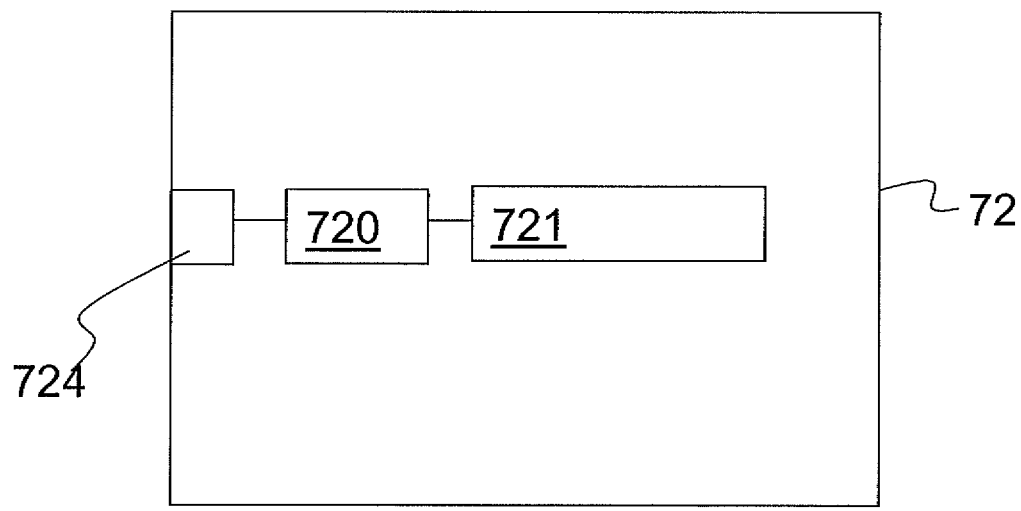

FIG. 7b is a block diagram illustrating the control unit 72 as implemented in a combination of hardware and software according to embodiments of the present invention. It comprises a processor unit 720, and interface 724 to the transceiver units. Furthermore the control unit comprises at least one computer program product 721 in the form of a non-volatile memory, e.g., an EEPROM, a flash memory and a disk drive. The computer program product 721 comprises a computer program, which comprises code means which when run on the processor unit 720 causes the processor unit 720 to perform the steps of the procedures described earlier in conjunction with FIG. 5.

Figure 8:
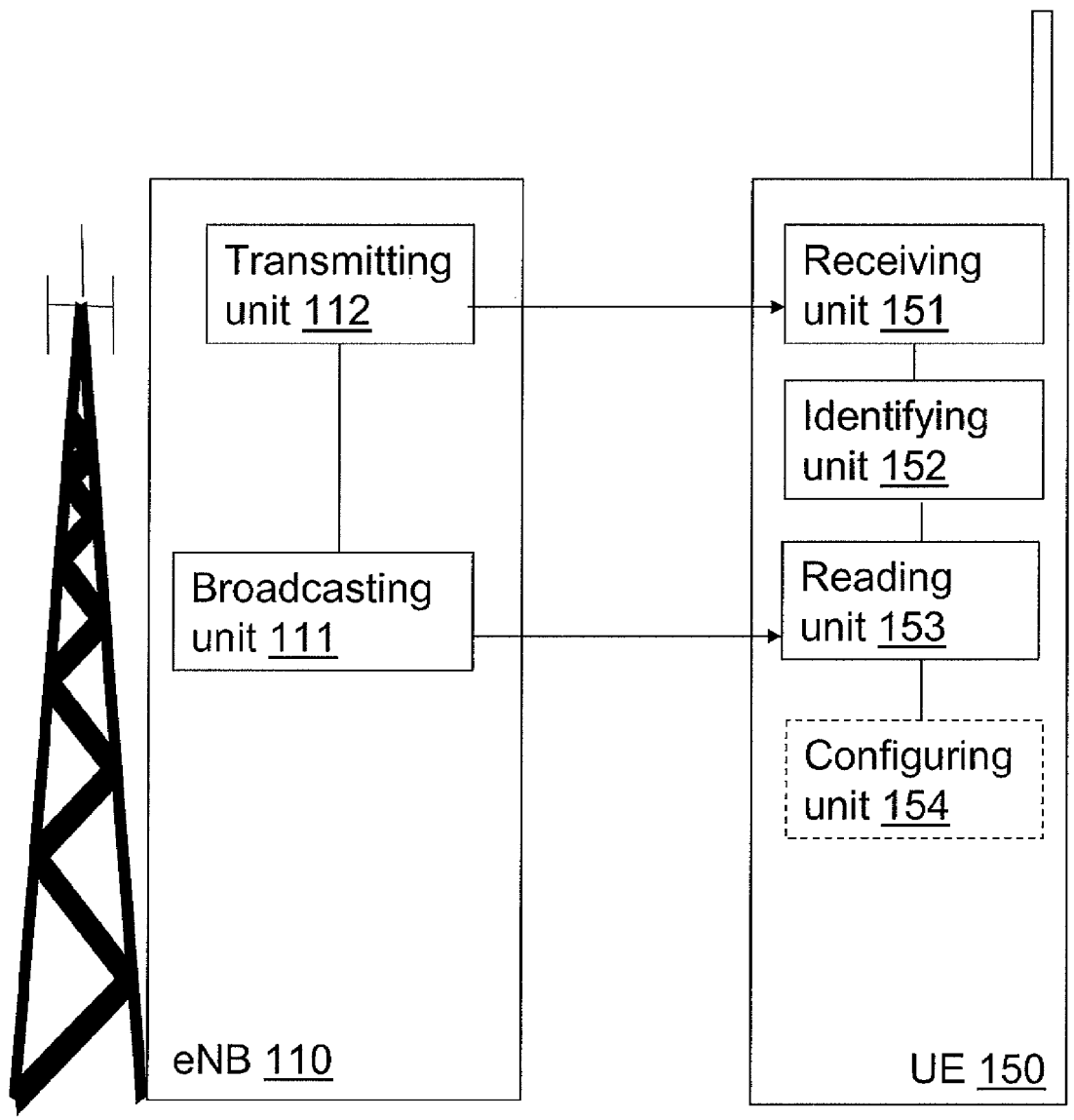
FIG. 8 illustrates schematically the user equipment and the eNB according to embodiments of the present invention.

The UE 150 and the RBS 110 are schematically illustrated in FIG. 8, according to embodiments of the present invention, and are configured to be used in a wireless communication system supporting carrier aggregation, such as LTE. The RBS 110 may e.g., be an eNB in an E-UTRAN, and is configured to broadcast SI in two cells or more. The UE 150 comprises a receiving unit 151 adapted to receive configuration information for an aggregation of e.g., two cells from the eNB 110. It also comprises an identifying unit 152 adapted to identify a first of the two cells based on a configuration rule stating that the first of the two cells has a status that is different from the status of the second remaining cell, and a reading unit 153 adapted to read the broadcasted SI only in the identified cell, i.e., in the first cell. In one embodiment of the present invention, the UE 150 further comprises a configuring unit 154 adapted to obey one or more parameters obtained from the read SI in the identified cell.

The eNB 110 in FIG. 8 is illustrated according to embodiments of the present invention and is adapted to transmit data to the UE 150 in at least two aggregated cells simultaneously. The eNB comprises a broadcasting unit 111 adapted to broadcast system information in the at least two cells, and a transmitting unit 112 adapted to transmit configuration information for an aggregation of e.g., two cells to the user equipment. In the second embodiment of the present invention, the configuration information comprises a configuration rule stating that a first of the two cells has a status that is different from the status of the remaining cell. In the third embodiment of the present invention, the cell with the different status is the primary cell. Furthermore, in the fourth embodiment the configuration information also comprises an indication of which one of the aggregated cells that is the primary cell, or in a more general way which aggregated cell that is the cell with the different status. The configuration information may in the fifth embodiment also comprise configuration parameters that are to be used instead of the SI parameters that are broadcasted in the remaining cell, e.g., the secondary cell. The first to fifth embodiments described above may be combined in any possible way.

The units 152-154 may be circuits integrated in a processing logic including e.g., a processor, microprocessor, an ASIC, or the like or maybe separate units/circuits. Embodiments of the present invention can be realized in many ways. For example, one embodiment includes a computer-readable medium having instructions stored thereon that are executable by a UE and/or RBS of a wireless communications system. The instructions perform the method steps of the present invention as previously described.

It should be noted that the embodiments described herein are not limited to any specific combination of hardware circuitry and software. The above mentioned and described embodiments are only given as examples and should not be limiting to the present invention. Although specific terms may be employed herein, they are used in a generic and descriptive sense only and not for purposes of limitation.

The invention claimed is:

1. A method for a user equipment in a wireless communication system supporting carrier aggregation, the system comprising a radio base station configured to broadcast system information in at least two cells, the method comprising:
   receiving configuration information for an aggregation of the at least two cells from the radio base station;
   identifying a first of the at least two cells based on a configuration rule stating that the first of the at least two cells has a status that is different from the status of the remaining ones of the at least two cells, wherein the received configuration information comprises an indication of which one of the at least two cells has the different status;
   reading the broadcasted system information only in the identified first cell; and thereafter
   receiving a signal from the base station indicative of a change of the status the identified first cell;
   responsive to the received signal, identifying a second of the at least two cells as having a status different from the status of any remaining cells; and
   reading the broadcasted system information only in the identified second cell.

2. The method of claim 1, further comprising obeying at least one parameter obtained from the read system information.

3. The method of claim 1, wherein the received configuration information comprises the configuration rule.

4. The method of claim 1, wherein the identified cell is a primary cell.

5. The method of claim 1, wherein the received configuration information comprises configuration parameters replacing system information broadcasted in the remaining ones of the at least two cells.

6. The method of claim 1, wherein the configuration information is received in a dedicated message.

7. A method for a radio base station in a wireless communication system supporting carrier aggregation, the radio base station being capable to transmit data to a user equipment in at least two aggregated cells, the method comprising:
   broadcasting system information in the at least two cells; and
   transmitting configuration information for an aggregation of the at least two cells to the user equipment, the configuration information comprising a configuration rule stating that a first one of the at least two cells has a status that is different from the status of the remaining ones of the at least two cells, wherein the configuration information also comprises an indication of which of the at least two cells has the different status, in order for the user equipment to read the broadcasted system information only in the first cell with the different status;
   thereafter, transmitting a signal indicative of a change of the status of the first cell, the signal enabling the user equipment to identify a second of the at least two cells as having a status different from the status of any remaining cells, in order for the user equipment to read the broadcasted information only in the second cell responsive to the signal.

8. The method of claim 7, wherein the cell with the different status is a primary cell.

9. The method of claim 7, wherein the transmitted configuration information comprises configuration parameters replacing system information broadcasted on the remaining ones of the at least two cells.

10. The method of claim 7, wherein the configuration information is transmitted in a dedicated message.

11. A user equipment configured to be used in a wireless communication system supporting carrier aggregation, the system comprising a radio base station configured to broadcast system information in at least two cells, the user equipment comprising:
   a receiving unit adapted to receive configuration information for an aggregation of the at least two cells from the radio base station;
   an identifying unit adapted to identify a first of the at least two cells based on a configuration rule stating that the first of the at least two cells has a status that is different from the status of the remaining ones of the at least two cells, wherein the received configuration information comprises an indication of which of the at least two cells has the different status; and
   a reading unit adapted to read the broadcasted system information only in the identified first cell;
   wherein the receiving unit is further adapted to thereafter receive, from the base station, a signal indicative of a change of the status of the identified first cell;
   wherein the identifying unit is further adapted to, responsive to the received signal, identify a second of the at least two cells as having a status different from the status of any remaining cells; and
   wherein the reading unit is further adapted to read the broadcasted system information only in the identified second cell.

12. The user equipment of claim 11, further comprising a configuring unit adapted to obey at least one parameter obtained from the read system information.

13. The user equipment of claim 11, wherein the received configuration information comprises the configuration rule.

14. The user equipment of claim 11, wherein the identified cell is a primary cell.

15. The user equipment of claim 11, wherein the received configuration information comprises configuration parameters replacing system information broadcasted in the remaining ones of the at least two cells.

16. The user equipment of claim 11, wherein the configuration information is received in a dedicated message.

17. A radio base station configured to be used in a wireless communication system supporting carrier aggregation, and capable to transmit data to a user equipment in at least two aggregated cells, the radio base station comprising:
- a broadcasting unit adapted to broadcast system information in the at least two cells; and
- a transmitting unit adapted to transmit configuration information for an aggregation of the at least two cells to the user equipment, the configuration information comprising a configuration rule stating that a first one of the at least two cells has a status that is different from the status of the remaining ones of the at least two cells, the configuration information also comprising an indication of which of the at least two cells has the different status, in order for the user equipment to read the broadcasted system information only in the first cell with the different status;
- the transmitting unit further adapted to thereafter transmit a signal indicative of a change of the status of the first cell, the signal enabling the user equipment to identify a second of the at least two cells as having a status different from the status of any remaining cells, in order for the user equipment to read the broadcasted information only in the second cell responsive to the signal.

18. The radio base station of claim 17, wherein the cell with the different status is a primary cell.

19. The radio base station of claim 17, wherein the transmitted configuration information comprises configuration parameters replacing system information broadcasted on the remaining ones of the at least two cells.

20. The radio base station of claim 17, wherein the configuration information is transmitted in a dedicated message.

21. The method of claim 1, wherein receiving the signal from the base station comprises receiving the signal in the form of a configuration message from the base station.

22. The user equipment of claim 11, wherein the received signal from the base station is received in the form of a configuration message.

* * * * *